Nov. 24, 1964  R. C. MORGAN  3,158,726
SWITCH BUTTON RETAINER FOR VEHICLE DOORS
Filed Feb. 7, 1962  2 Sheets-Sheet 1
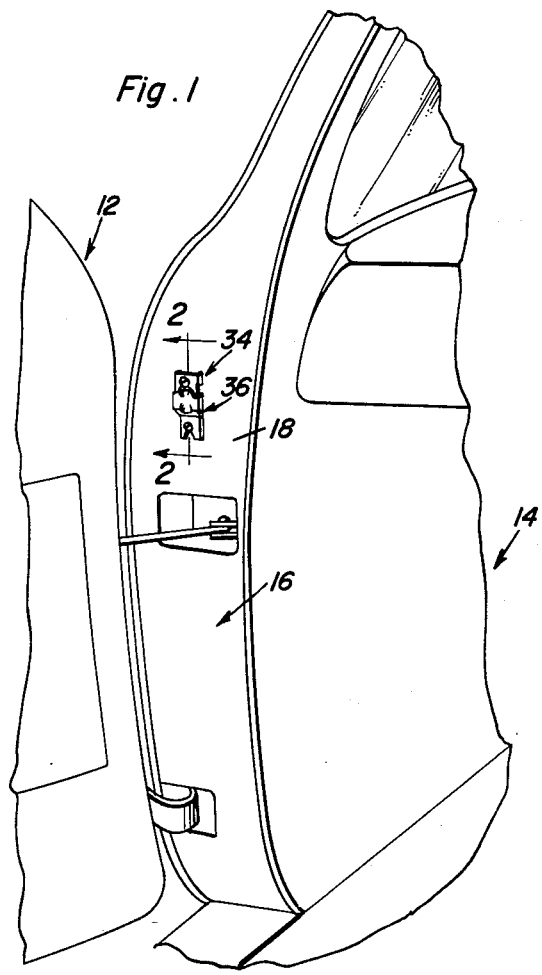
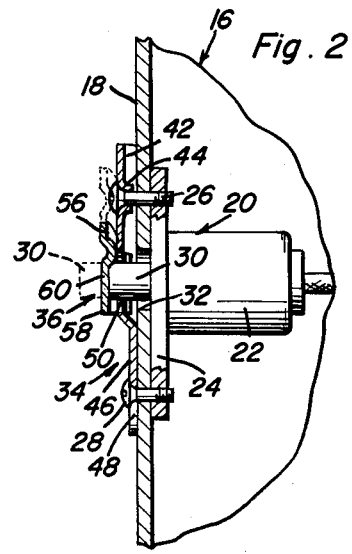
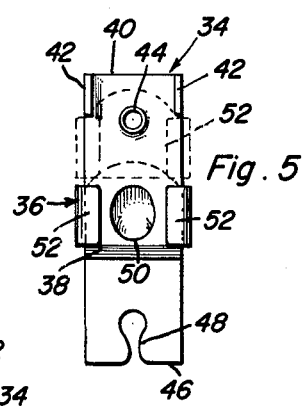
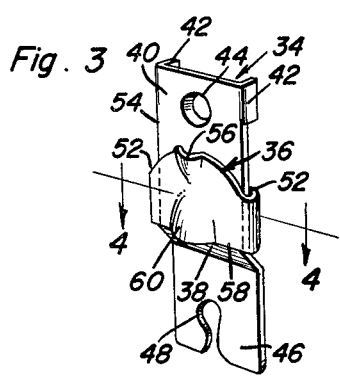
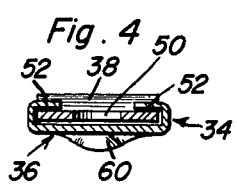
Robert C. Morgan
INVENTOR.
BY Nov. 24, 1964 R. C. MORGAN 3,158,726
SWITCH BUTTON RETAINER FOR VEHICLE DOORS
Filed Feb. 7, 1962 2 Sheets-Sheet 2
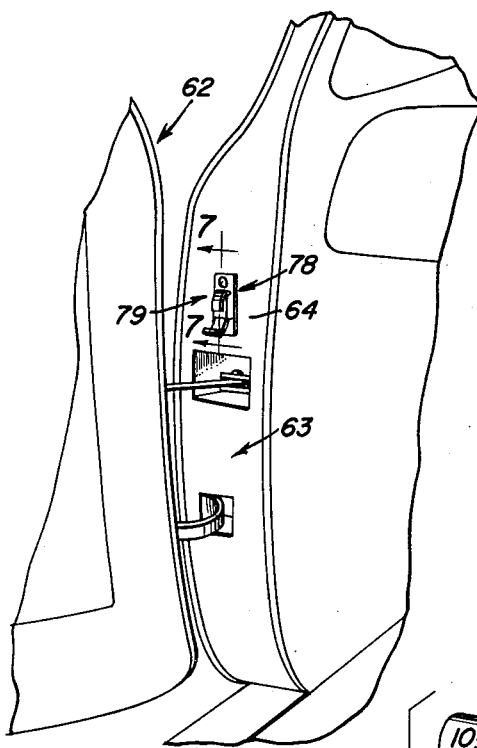
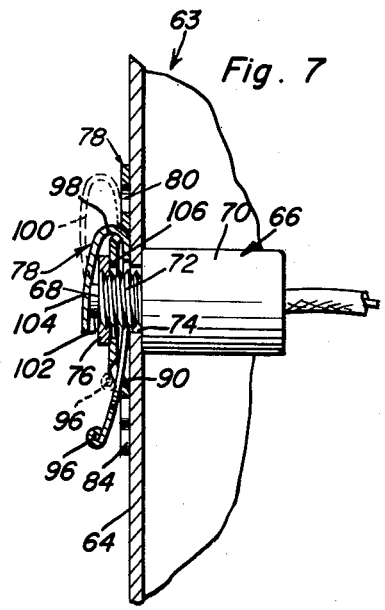
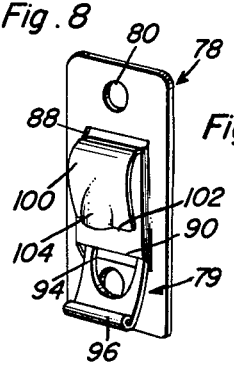
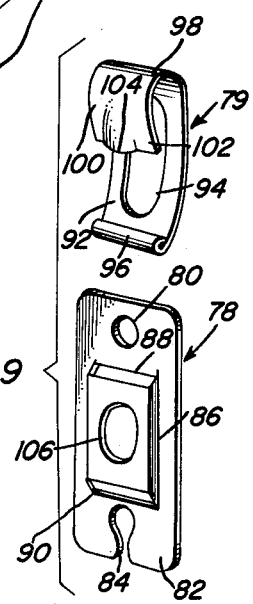
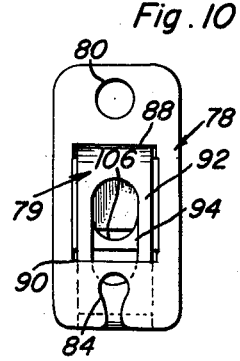
Robert C. Morgan
INVENTOR.

United States Patent Office 3,158,726
Patented Nov. 24, 1964

3,158,726
SWITCH BUTTON RETAINER FOR
VEHICLE DOORS
Robert C. Morgan, 1310 S. Quincy St., Topeka, Kans.
Filed Feb. 7, 1962, Ser. No. 171,676
4 Claims. (Cl. 200—169)

This invention relates, broadly classified, to automotive accessories, but more particularly to vehicle door frame attachments which are designed and adapted to be mounted on the door frame and are appropriately constructed to releasably retain a spring-loaded projectible and retractible switch button in an "off" position when the button depressing actuating door is open.

The door-depressed switch button referred to above conforms with the one commonly provided for automatically switching on the interior source of light when the door (usually the two front doors) is swung open. There are many occasions when an entrance and exit light is neither needed or desired. For instance, such a light is ordinarily not of use during the day. Moreover, there are occasions at night, when the car, having been parked is occupied with doors open for ventilation, that the light source is not necessary and, in fact, is objectionable. For example, at drive-in motion picture shows, horse shows, outdoor athletic events and the like, one may want a door (or doors) open but without interior lighting. Therefore, and as is evident, a simple, practical and inexpensive switch button holder or retainer is needed. It follows that the present invention has been devised to enable the user thereof to retain the associated switch button in a depressed open switch position or closed position at will and in keeping with requirements.

A general object of the invention is to improve upon prior art switch button holding and releasing devices and, in doing so, to provide an adaptation, or adaptations, which is simple in construction, readily applicable and removable and otherwise adapted to effectually serve the purposes for which it is intended.

Another object of the invention is to provide users with a switch button retaining and releasing accessory which, being in the form of an attachment, may be purchased from an automotive accessory store and readily attached by the purchaser, not only for regular or large size automobiles but for small cars where, for example, the switch means, as is ordinarily the case is provided with a screw-threaded neck for the projectible and retractible plunger, said neck being held in place by a single assembling and clamping nut.

As will be evident from the drawings two embodiments of the invention are herein disclosed, it being thought that one of the two, if properly selected and installed, will satisfactorily serve the results desired.

Generically, the concept has to do with a simple mechanical manually attachable and usable retaining and releasing device or accessory for a spring-loaded projectible and retractible electric switch button such as is currently in use on automobiles, trucks and similar vehicles. The preferred embodiment is characterized by a simple and expedient adapter plate, said plate having, preferably at a central portion thereof, an elonged hole to accommodatingly receive and encircle the switch operating button. This plate is provided, at end portions with attaching means for attachment to existing fasteners on the stated door frame. The plate is provided with a switch button depressing and retaining member or component part which is slidingly mounted on the plate between the end portions of the plate. This member is provided with a button capping and holddown detent to fit temporarily over the end of the button, and has a lower free marginal edge portion which, when the button is in a projected position, is adapted to rest against a cooperating surface of the button, whereby the button serves to hold the retaining member in an up or out-of-the-way button-releasing position.

Both embodiments of the invention are characterized by an elongated or rectangular plate referred to here as an adapter, said plate being provided at an upper end with an opening to accommodate a top attaching screw or fastener, and being provided at the bottom with a keyhole slot which may be slipped over the usual bottom fastener or screw simply by loosening and releasing but not removing said screw. The retainer is slidable on a median portion of the adapter plate and in both instances the lower edge portion, which is on the front or exterior side of the adapter plate, has a concavo-convex indentation or embossment which provides the aforementioned seating, capping and shielding detent.

The retainer in one embodiment of the invention comprises a simple clip or plate having bent flanges at the ends slidingly keyed on longitudinal edge portions of the adapter plate.

In another form of the invention the adapter plate is provided with transverse vertically or longitudinally spaced slots and the shiftable retainer clip has a plate portion which is provided with a clearance slot and which is slidable in the slots on the adapter plate, there being a fingergrip at the lower end of the clip, and a return-bend at the upper end which is such in design and construction that it provides the desired detent.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view showing a portion of the hinged automobile or vehicle door swung to an open position and exposing the portion of the frame herein under consideration and which illustrates, on a small scale, the switch button retainer with the sliding retainer in its down button-depressing and holding position;

FIGURE 2 is a view on a large scale, with parts in section and elevation, taken on the plane of the vertical section line 2—2 of FIGURE 1 and which shows the retainer elevated in dotted lines, this being the button depressing switch opening position of the retainer;

FIGURE 3 is a view in perspective of the full-sized attachment-type button retainer;

FIGURE 4 is a cross-section on the line 4—4 of FIGURE 3;

FIGURE 5 is a rear elevation, observing FIGURE 3 for example, in a direction from right to left;

FIGURE 6 is a view like FIGURE 1 showing the modified switch button retainer construction;

FIGURE 7 is a view on a larger scale, with parts in section and elevation, taken on the vertical line 7—7 of FIGURE 6 and which, like FIGURE 2, shows the retainer or clip elevated to a releasing position in dotted lines;

FIGURE 8 is a perspective view of the embodiment of the invention now under consideration;

FIGURE 9 is an exploded perspective view showing the two component parts and how they are specifically constructed; and FIGURE 10 is a rear elevation observing FIGURE 8 in a direction from right to left.

Reference will be made to FIGURES 1 to 5, inclusive. In FIGURE 1 the automobile or vehicle door, a hinged type, is denoted by the numeral 12, the automobile body at 14, the vertical door frame portion at 16 and the surface, herein under consideration, at 18. With reference now to FIGURE 2, the numeral 20 designates generally the customarily used spring-loaded door-actuated switch for switching interior lighting (not shown) off and on. The numeral 22 designates the cylinder and 24 the attaching flange which is secured to the frame surface 18 by upper and lower screws 26 and 28. The depressible or projectible and retractible switch button is denoted at 30 and the accommodation hole therefore is denoted at 32.

The accessory or attachment is made up of two component parts 34 and 36. The part 34 comprises a sheet metal or an equivalent rectangular or elongated plate which is also referred to as an adapter. It will be noted that by way of a transverse median bend 38 the upper portion 40 of the plate is outwardly offset. This upper portion is provided on longitudinal edge portions with a pair of right-angularly bent spaced parallel lug-like flanges 42 which in practice rest against the surface 18 as perhaps best shown in FIGURE 2. The upper portion 40 is also provided with a countersunk opening 44 to accommodate the attaching screw 26 in the manner illustrated. The lower edge portion 46 is provided with a keyhole-shaped slot 48 which opens through the lower edge and which is fitted over the attaching screw 28 simply by loosening the screw in an apparently obvious manner. The offset portion is provided with an elongated aperture here described as a hole 50 and which serves to accommodate the projectible and retractible button 30. The second plate, more particularly the clip 36 constitutes the adjustable retainer and is applied over the exterior surface of the part 40 and the transverse end portions 52 are fashioned into hook-like flanges which are slidingly engaged over the cooperating lengthwise edges 54. The upper curvate edge portion is provided with an outwardly bent lip 56 which serves to clear the head of the fastening screw 26. The lower edge portion 58 is provided centrally with an indentation which may be described as an embossment 60 and which is substantially concavo-convex and sized and shaped to slide over the end of the button 30 in a manner to provide a seat and also a retaining cap. When the portion 60 (also called a detent) is in the full line position shown in FIGURE 2 it obviously serves to depress the switch button and thus open the switch. When the clip 36 is lifted to the dotted line position shown in FIGURE 2 the lower edge 58 rests atop the projecting button and the button therefore serves to maintain the clip in an up or out-of-the-way position.

It will be obvious that by removing the screw 26 the attachment can be readily applied. The screw 28 is left in place but is loosened and the keyhole slot is fitted over the headed shank. Then, the countersunk opening 44 is lined up with the screw hole in the aforementioned flange 24 and the screw 26 is replaced and screwed in place. The device is then ready for use in what is believed to be an obvious manner.

Referring now to FIGURES 6 to 10 and with reference to FIGURE 6 the automobile or vehicle door is denoted at 62, the door frame 63 and the surface at 64. In FIGURE 7 the switch 66 is of a type which is currently being used on so-called small and medium-sized compact cars. In this instance the spring-loaded end of the button or plunger 68 (not detailed) is mounted in the cylinder 70, the cylinder having a screw-threaded neck 72 projecting through the door frame opening 74, said neck serving to accommodate a simple assembling and retaining nut 76. As before mentioned this invention is adapted to accommodate virtually all makes of automobiles and the form of the invention now under consideration is particularly adapted for use in the manner illustrated in FIGURE 7. With reference to FIGURE 9 the adapter 78 is provided in its upper end portion 80 with a screw hole which may be used in the manner already illustrated, for example, in FIGURE 2. The lower end portion 82 has a keyhole slot 84 therein and the median portion of the plate is bent and offset outwardly as at 86. The upper and lower end portions of the offset portion have transverse longitudinally spaced slots 88 and 90. These slots serve to accommodate the plate portion 92 of the sliding retainer clip. The plate portion has a clearance slot 94 to accommodate the button. The slot is sufficiently long to function in the manner shown where, more specifically, it cooperates slidingly with the screw-threaded neck 72. This plate portion is slidable in the slots 88 and 90 in the manner illustrated in FIGURE 8. The lower end portion is curved or bent outwardly and then curled upon itself to provide a suitable fingergrip 96. The upper end portion of the plate is bent upon itself at 98 to provide a depending return bend 100 which constitutes the readily applicable and removable retainer. The lower edge 102 assumes the position shown in FIGURE 7 when the clip is in a position to release the button 68. The concavo-convex or equivalently bent detent is denoted at 104 and functions in the manner already described. In this form of the invention when applied to the type of switch shown in FIGURE 7 the features 80 and 84 are, of course, not used. On the other hand, the elongated opening 106 is slipped over the screw-threaded neck 72 to accommodate the neck and the button and the entire attachment is held in place when the nut 76 is replaced.

It will have been noticed that the clip in the modification shown, for example, in FIGURE 3 is entirely on the outward or exterior surface of the adapter 34. In the modification just considered the plate 92 of the sliding retainer or clip 79 is chiefly on the rearward or back side of the adapter or plate 78. However and in both instances the detent is adjustable toward and from the button opening (50 or 106, as the case may be) to achieve the results desired.

It is believed that a careful consideration of the specification in conjunction with the views of the drawings will enable the reader to obtain a clear and comprehensive understanding of the two forms of the invention under consideration, the manner in which they are constructed, applied and used. Therefore, a more extensive description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A two-part switch button retaining and releasing attachment for a vehicle door frame having a door responsive button-equipped vehicle interior light switch mounted, as is customarily done, on said door frame comprising: an elongated adapter plate having a fastener accommodating hole at an upper end and also having a keyhole slot therein at a lower end of the plate, a median substantial lengthwise portion of said plate being outwardly offset, said offset portion being provided with a hole which functions to accommodate a switch button, and a switch button depressing and hold-down clip slidingly keyed on the outwardly offset portion of the plate, said clip having a concavo-convex detent aligned with and functioning to receive and temporarily seat the button and in this manner to engage and to forcibly depress the button but also to use and rely on the button as a ways and means of holding said clip in the position to which it has been moved, said clip having a free edge which is adjacent to and cooperates with said detent and is designed and expressly adapted to merely rest atop an intended surface of the switch button in such a manner that when the button is in its normal projected on position the button cooperating with said edge holds the detent up and causes it to assume an out-of-the-way button-freeing and releasing position.

2. A two-part switch button retaining and releasing attachment for a vehicle door frame having a button-equipped switch mounted on said frame comprising: in combination, an elongated adapter plate having a fastener accommodating hole therein at one end and a keyhole-slot therein at the other end, a median and end portion of said plate being outwardly offset and provided with a switch button hole, and a button depressing and holddown clip comprising a second plate superimposed on the offset portion of said first-named plate and having hooked end-flanges slidingly mounted on the lengthwise edge portions of the offset portion, the lower edge portion of said clip having a centralized concavo-convex embossment defining a button-end capping and retaining detent, the upper end of the first-named plate being provided on longitudinal edges with spaced parallel opposed right angularly bent flanges which constitute ear-like lugs which are adapted to abut the door frame surface and which serve to stabilize and properly locate the offset portion in spaced parallelism relative to said surface.

3. A two-part switch button retaining and releasing attachment for a vehicle door frame having a button-equipped switch mounted on the frame in such a manner that opening and closing the door functions to actuate the switch, said attachment comprising, in combination, one part embodying an elongated adapter plate having a fastener accommodating hole at an upper attachable end of the plate, and a keyhole slot at the lower end of the plate, a substantial part of the median portion of said plate being deformed and outwardly offset in a lengthwise direction and disposed in a plane spaced outwardly from the plate proper and provided with a hole for clearance of the pushbutton of said switch, said offset portion having upper and lower transverse slots, said slots being spaced apart in parallelism and being located inwardly of and generally parallel to the respective upper and lower ends of said plate and being also located above and below, respectively, the pushbutton hole, and a button-retaining and releasing clip constituting the second part and embodying a plate portion slidingly contacting a rearward face of the adapter plate and having end portions thereof slidable through their respectively cooperating slots, a lower end portion of said clip having a finger-grippable operating means and the upper end portion of said clip having a button depressing holddown, said holddown and said operating means being located on the forward face of said adapter plate, and said holddown being adapted to cap over a cooperating terminal end portion of the button and also having a terminal edge portion which can be caused to rest on a peripheral surface of the button when the holddown is in an out-of-way position.

4. A switch button retainer comprising: a clip approximately J-shaped in edge elevation and embodying an elongated plate having an elongated button passing clearance slot, a finger-grip at a lower end of the plate and a depending return-bent upper end, said return-bent portion having a free lower edge portion provided with an outwardly deformed concavo-convex button seating, capping and shielding detent, and an attaching and mounting plate for said clip, the median portion of said attaching plate having spaced parallel transverse slots and said clip having its slotted portion passing through and slidingly keyed in said slots, that portion of said attaching plate between said slots having an aperture adapted to accommodatingly pass an associated switch button therethrough.

References Cited by the Examiner
UNITED STATES PATENTS 2,786,911  3/57   Morgan _____ 200—169
2,873,333  2/59   Jacaman _____ 200—169
2,875,290  2/59   Shattow _____ 200—169

BERNARD A. GILHEANY, *Primary Examiner.*

ROBERT K. SCHAEFER, *Examiner.*